United States Patent [19]

Yagi et al.

[11] 4,160,431
[45] Jul. 10, 1979

[54] INSERT LINER FOR DIVIDED AUXILIARY COMBUSTION CHAMBER OF ENGINE

[75] Inventors: Shizuo Yagi, Asaka; Hiroshi Kogure, Tokorozawa; Saburo Matsuoka, Shiki, all of Japan

[73] Assignee: Honda Giken Kogyo Kabushiki Kaisha, Tokyo, Japan

[21] Appl. No.: 890,533

[22] Filed: Mar. 27, 1978

[51] Int. Cl.² .................... F02B 19/18; F02B 75/02
[52] U.S. Cl. .................... 123/75 B; 123/191 S; 123/191 SP; 123/32 SP; 123/32 ST; 123/32 L; 123/32 K
[58] Field of Search ............ 123/191 S, 191 SP, 75 B, 123/32 ST, 32 SP, 32 C, 32 K, 32 L, 32 AA

[56] References Cited

U.S. PATENT DOCUMENTS

| | | | |
|---|---|---|---|
| 2,380,615 | 7/1945 | Sheppard | 123/32 K |
| 2,804,858 | 9/1957 | Schilligen | 123/32 C |
| 3,832,984 | 9/1974 | Taguchi | 123/75 B |
| 3,853,097 | 10/1974 | Kume | 123/32 SP |
| 3,989,015 | 11/1976 | Rivere | 123/32 SP |
| 4,004,563 | 1/1977 | Nakamura | 123/32 K |
| 4,076,000 | 2/1978 | Takao | 123/191 S |
| 4,098,246 | 7/1978 | Noguchi | 123/191 S |
| 4,116,191 | 9/1978 | Yanugehara | 123/191 S |

*Primary Examiner*—Ronald H. Lazarus
*Attorney, Agent, or Firm*—Lyon & Lyon

[57] ABSTRACT

The auxiliary combustion chamber of a four-cycle stratified-charge piston engine is divided into a primary cavity and a secondary cavity both formed in an insert liner received in the cylinder head. The primary cavity receives a relatively rich mixture which passes into the secondary cavity, and the main combustion chamber receives a relatively lean mixture. A spark plug communicates with the primary cavity. A long torch passage connects the primary cavity with the central portion of the main combustion chamber, and one or more short torch passages connect the secondary cavity with a peripheral portion of the main combustion chamber. The purpose is to reduce emission of $NO_x$ without adversely affecting emissions of CO and HC, and to improve fuel economy.

3 Claims, 5 Drawing Figures

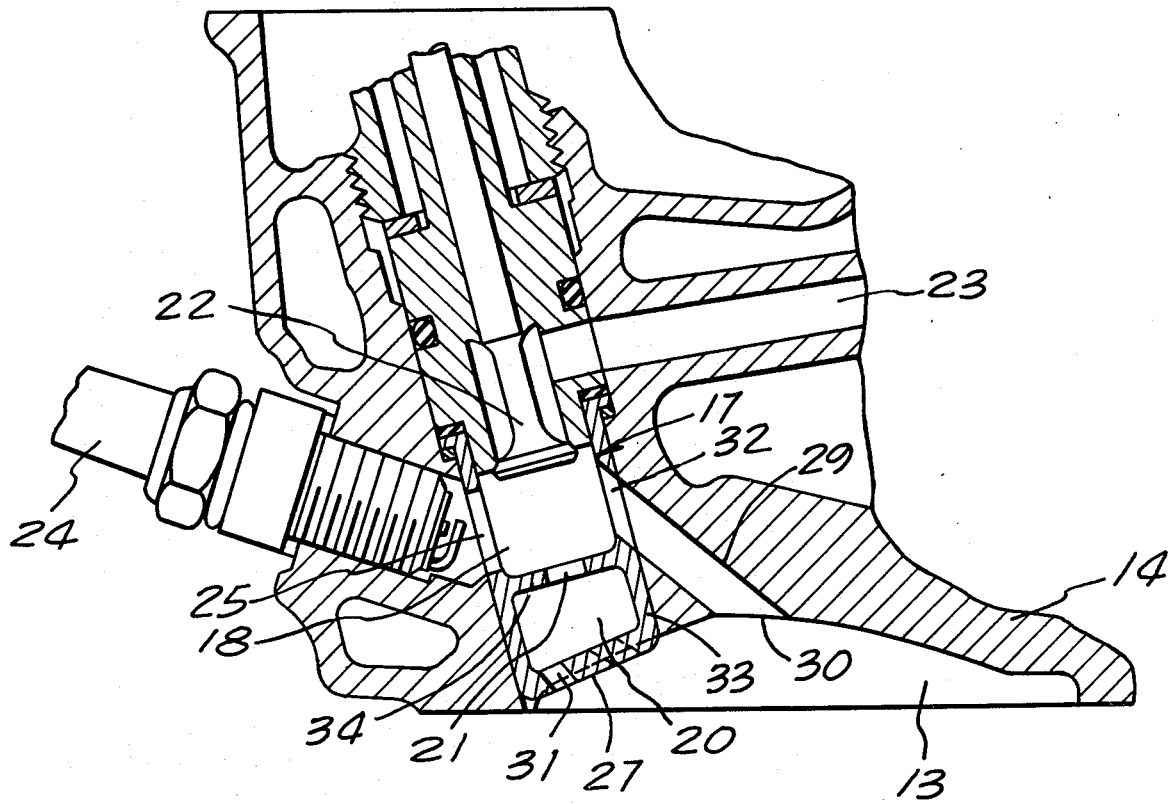

INSERT LINER FOR DIVIDED AUXILIARY COMBUSTION CHAMBER OF ENGINE

The device of this invention is similar in many respects to the disclosure of the copending application of Yagi et al entitled "Divided Auxiliary Combustion Chamber For Internal Combustion Spark Ignition Engines" filed of even date herewith.

This invention relates to a four-cycle stratified-charge internal combustion spark ignition engine. This invention has as its primary object to enable operation on the rich side of the lean range and to reduce the amount of $NO_x$ emissions in the exhaust and to improve the indicated specific fuel consumption (ISFC) and hence the engine power output, these improvements to take place over the entire range of operation loads on the engine, and without increasing emissions of CO and HC. When such an engine is mounted in a motor vehicle the driveability is improved.

A strong requirement for better fuel economy has long been made on the internal combustion engine; therefore, even when the exhaust emissions are reduced to the desired level, a good fuel economy should be maintained.

It is desirable to operate the engine on an overall lean air-fuel ratio because this not only results in reducing the $NO_x$ emission, but also improves the indicated specific fuel consumption (ISFC). However, it is extremely difficult with conventional engines without catalytic converters to reduce the exhaust emissions to the required level and at the same time to improve the fuel economy.

It is known, for stratified charge engines, that the overall air-fuel ratio should be leaner than stoichiometric in order to minimize generation of CO, HC and $NO_x$ emissions at the same time. However, if the engine is operated over a wide range of loads, there is a limit on how lean the overall air-fuel ratio may be set. During relatively light load operation of the engine, an excessively lean air-fuel ratio will cause increases in the generation of CO and HC. On the other hand, during relatively heavy load operation of the engine, an excessively lean air-fuel ratio will cause deterioration of driveability of a motor vehicle.

In order to reduce the $NO_x$ emission in the exhaust and at the same time improve the indicated specific fuel consumption (ISFC), the combustion process in the combustion chamber has been studied for each range of loads on an engine of the torch ignition type. It has been found from this study that the following improvements should be made regarding the formation of torch flames contributing to the combustion of lean mixture in the main combustion chamber.

The percentages of generation of CO, HC and $NO_x$ emissions from an engine vary greatly according to its load conditions: The generation of HC will be higher as the load on the engine becomes lighter, and it will be lower as the load on the engine increases, whereas the generation of $NO_x$ will be lower at light loads and will be higher at heavy loads. Consequently, in the range of light load operation of the engine, the emphasis should be placed on the reduction of the HC emission, and in the range of heavy load operation of the engine the emphasis should be placed on the reduction of the $NO_x$ emission.

In order to prevent the increase of CO and HC emissions in the range of light load operations while the overall air-fuel ratio is lean, it has been suggested that a plurality of torch openings be provided to improve the combustion by multi-torch flames injection; however, this results in increase of the speed of combustion in the range of heavy load operations to increase the generation of $NO_x$ emission. On the other hand, in the range of heavy load operations, in order to prevent the increase of $NO_x$ emission, the torch flame should be directed mainly to the center of the main combustion chamber. However, this results in an increase of CO and HC emissions in the range of light load operations.

With this relationship known between the load conditions of the engine and its exhaust emissions, it has been found that:

(1) In the range of light load operation of the engine the torch flames should be directed effectively toward the center of the main combustion chamber and in the neighborhood of the cylinder walls; and (2) In the range of heavy load operation of the engine the torch flames should be directed mainly to the center of the main combustion chamber.

During light load operation of the engine, the volumetric efficiency is low, the percentage of residual gas in the mixture in the cylinder is high, and turbulence of the mixture in the main combustion chamber is weaker as compared with that during heavy load operation of the engine, so that combustion is likely to be unstable. In order to cause more stable combustion and thereby reduce the CO and HC emissions and at the same time improve the indicated specific fuel consumption (ISFC), it is essential that a plurality of torch openings be provided and the time difference in combustion timing by multi-torch flames oriented in two directions and located in different positions be accomplished to reduce $NO_x$.

On the other hand, during heavy load operation of the engine, the volumetric efficiency is high, and turbulence of mixture in the main combustion chamber is greater as compared with turbulence during light load operation of the engine, so that in order to minimize the increase of $NO_x$ emission, it is essential that the combustion be prevented from becoming unnecessarily rapid, and this is accomplished by directing the torch flame mainly to the center of the main combustion chamber. In this way, $NO_x$ emission in the range of heavy load operation can be reduced.

The structure employed to produce the results described above requires that each auxiliary combustion chamber be divided into a primary cavity and a secondary cavity. A first carburetor supplies a relatively lean air-fuel mixture to the main combustion chamber and a second carburetor supplies a relatively rich air-fuel mixture to the primary cavity of the auxiliary combustion chamber, and then to the secondary cavity thereof. A primary torch passage extends from the primary cavity to the main combustion chamber and has an outlet end positioned near the center of the main combustion chamber. A spark plug communicates with the primary cavity. One or more secondary torch passages extend from the secondary cavity to the main combustion chamber and each has an outlet end positioned adjacent a peripheral zone of the main combustion chamber. Accordingly, the primary object of this invention is to reduce the $NO_x$ emission in the exhaust over the entire range of loading of the engine without increasing emissions of CO and HC, while at the same time improving the indicated specific fuel consumption (ISFC) and hence the engine power output, thereby improving the driveability of the motor vehicle.

Tests have shown that an engine constructed in this manner operates with reduced $NO_x$ emission even when the overall air-fuel mixture is leaner than stoichiometric, and this is accomplished without increasing the generation of CO and HC emissions.

According to a comparison between this invention and a conventional engine, this invention improves $NO_x$ emission and ISFC. Moreover, it will be understood that if the required level of $NO_x$ emission remains the same as with the conventional engine, this invention makes it possible to set the air-fuel ratio on the rich side of the lean range whereby an improvement is achieved in the driveability of the motor vehicle.

Other and more detailed objects and advantages will appear hereinafter.

Figure 1:
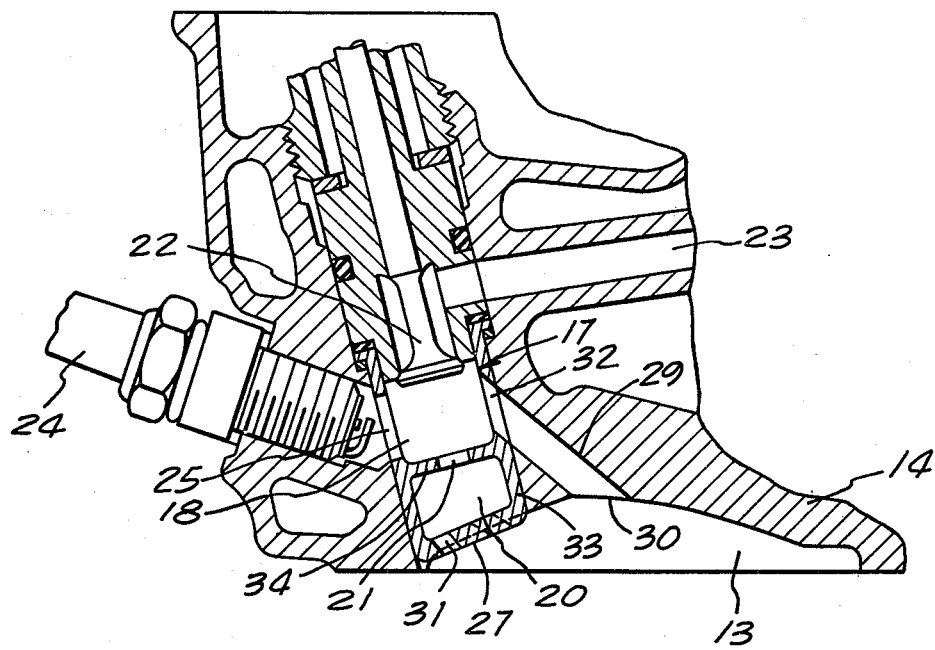
FIG. 1 is a sectional side elevation partly broken away showing a preferred form of the present invention.

Referring to the drawings, an engine cylinder head generally designated 14 has one or more cylinders each with a piston. The main intake valve 15 controls flow of relatively lean air-fuel mixture into the main combustion chamber 13.

An auxiliary combustion chamber generally designated 17 is formed in the cylinder head 14 and is divided into a primary cavity 18 and a secondary cavity 20. The cavities are connected by an opening 21. An auxiliary intake valve 22 controls the flow of a relatively rich air-fuel mixture through the auxiliary intake passage 23 into the primary cavity 18. The electrodes of a spark plug 24 communicate with the primary cavity 18 through the opening 25.

An exhaust valve 26 is provided to control the flow of exhaust gases from the main combustion chamber 13. The main intake valve 15, exhaust valve 26, and auxiliary intake valve 22 are all operated in timed sequence by means of conventional mechanism, not shown.

A primary torch passage 29 communicates at one end with the primary cavity 18, and the other end 30 of the torch passage 29 is positioned near the center of the main combustion chamber 13. When the spark plug 24 ignites the mixture in the primary cavity 18 a torch flame is projected through the relatively long primary torch passage 29 toward the central axis of the piston. The ignition of the mixture in the primary cavity 18 causes a flame to pass through the opening 21 into the secondary cavity 20 and then through the relatively short secondary torch passages 31 into a peripheral part of the main combustion chamber 13.

The primary torch passage 29 communicates with the primary cavity 18 through an opening 32 in the side wall of the insert liner 33. This insert liner also contains the openings 21 and 25, and an integral divider wall 34 of this insert liner 33 forms the boundary between the cavities 18 and 20. The integral end wall 27 is exposed to the main combustion chamber 13 and contains the short secondary passages 31. The integral end wall 27 exposed to the main combustion chamber 13 is heated by the high temperature of burning gases in the main combustion chamber and, therefore, effectively evaporates any droplets of fuel which might reach the cavity 20, with the result that the HC emission is reduced. The desired position and angularity of each of the short secondary passages 31 is relatively easy to achieve because these passages are formed in the insert liner 33 prior to its installation into the cylinder head 14.

Operation of the engine under light load. During the intake stroke of the piston a charge of relatively lean mixture is drawn into the main combustion chamber 13, and a charge of relatively rich mixture is simultaneously drawn into the auxiliary combustion chamber 17. This rich mixture drawn into the auxiliary combustion chamber 17 is first introduced into the primary cavity 18. Since the quantity of rich mixture, in the case of light load operation, is set to be greater as compared with heavy load operation, the rich mixture is also drawn into and through the secondary cavity 20 through the communicating openign 21. As a result, both the primary cavity 18 and the secondary cavity 20 are filled with a fresh charge of rich mixture.

Next, during the following compression stroke of the piston, the lean mixture in the main combustion chamber 13 flows back through the torch passages 29 and 31 into both of the cavities 18 and 20 to dilute the mixtures therein. Accordingly, the mixtures in the two cavities 18 and 20 immediately before ignition have approximately the same air-fuel ratio and suitable for ignition. Upon ignition by the spark plug 24, torch flames are projected through the torch passages 29 and 31 into the main combustion chamber 13 to burn the relatively lean mixture therein. Combustion begins first at the outlet end of the short torch passage 31, and later at the outlet end of the longer torch passage 29.

The secondary torch flames, beginning earlier than the primary torch flame, are projected through the secondary torch passages 31 located in the neighborhood of the wall of the cylinder to burn the unburned gas in the neighborhood of the peripheral wall, and the primary torch flame passing through the primary torch passage 29 is directed approximately to the center of the main combustion chamber 13 and burns the relatively lean mixture in the main combustion chamber 13 and successively to its periphery. The dual combustion process described above promotes combustion of end gas that is not completely burned through the action of the torch flame through the primary torch passage 29 and reduces the peak pressure and peak temperature, and therefore reduces $NO_x$ emission without adversely affecting CO and HC emissions which are already controlled at low level.

Operation of the engine under heavy load. During the intake stroke of the piston, a charge of relatively lean mixture is introduced into the main combustion chamber 13, and a charge of relatively rich mixture is simultaneously drawn into the auxiliary combustion chamber 17. However, even though the quantity of rich mixture in the auxiliary combustion chamber 17 in the case of heavy load operation is set, unlike the one in the case of light load operation, to be smaller, the primary cavity 18 is thoroughly scavenged as in the case of light load operation described above, and is filled with a fresh charge of rich mixture. However, the secondary cavity 20 is not fully scavenged because of the relatively small amount of rich mixture supplied, and because the flow-resistance of the communicating opening 21 allows only a small amount of freshly charged rich mixture to remain in the cavity 20. Consequently, the percentages of fuel weights in the two cavities at the end of the intake stroke of the piston 12 are such that the fuel weight is considerably greater in the primary cavity 18 and smaller in the secondary cavity 20.

Scavenging is almost complete in the secondary chamber at light loads, but as the load on the engine increases the scavenging efficiency in the secondary chamber decreases. This is brought about by operating and geometric factors of the torch passages 29 and 31 and the opening 21. During the subsequent compression stroke, the lean mixture in the main combustion chamber 13 flows back through the primary torch passage 29 and secondary torch passage 31, and immediately before ignition the mixture in the primary cavity 18 is suitable for ignition and the mixture in the secondary cavity 20 is approximately the same as the lean mixture in the main combustion chamber 13. That is to say, torch engines generated in the two cavities are different so that combustion timing is different and duration of torch flame projection from the primary and secondary torches is also different.

The following example is given by way of illustration and not of limitation: Consider a four cylinder four cycle engine of 1500 cc stroke volume. Assume that the volume of the primary cavity 18 is 3 cc and the volume of the secondary cavity 20 is also 3 cc. At idle speed of the engine approximately 11.4 cc per cycle of rich mixture is drawn into and through the cavities and through the torch passageways 29 and 31. Because of the relative size of the passages 29 and 31 and of the communicating opening 21, about two-thirds of the total 11.4 cc are drawn through the torch passage 29 and the remaining one-third through the secondary passages 31. Accordingly, at the end of the intake stroke of the piston, the primary cavity 18 is fully scavenged and contains only rich mixture, and the secondary cavity 20 is almost fully scavenged. When the engine is operating under heavy load, however, only 6.0 cc per cycle of rich mixture is drawn into the cavities during the intake stroke of the piston. Two-thirds of this or about 4.0 cc moves through the primary torch passage 29, the remainder of about 2.0 cc passing through the secondary passages 31. Accordingly, scavenging of the secondary cavity 20 is incomplete.

When the mixture in the primary cavity 18 is ignited by the spark plug 24, the torch flame is projected through the primary torch passage 29 into the main combustion chamber. Also, flame passes through the opening 21 into the secondary cavity 20 and then through the secondary torch passages 31 into the main combustion chamber 13. However, since the mixture in the secondary cavity 20 is lean as compared to the mixture in the primary cavity 18, the mixture in the main combustion chamber 13 is caused to burn mainly by the torch flame from the primary torch passage 29.

As a result, the torch flame projected through the primary torch passage 29 approximately to the center of the main combustion chamber 13 causes the lean mixture therein to burn from its center toward its periphery by almost uniform propagation of the flame, resulting in efficient combustion. Consequently, a sudden rise both in the combustion pressure and temperature is prevented from occurring, whereby the generation of $NO_x$ emission is minimized and in addition the indicated specific fuel consumption (ISFC) is improved.

Summarizing, during heavy load operation of the engine the strength of the secondary torch flames is reduced to control the turbulence of the mixture in the main combustion chamber 13, and the mixture therein is made to burn from the center uniformly toward the periphery, whereby excessively rapid combustion is avoided and sudden rise of combustion temperature is controlled for minimizing the generation of $NO_x$ emission and improving the indicated specific fuel consumption (ISFC). This invention makes it possible to set the air-fuel ratio on the rich side of the lean range, whereby engine power output is improved.

When:

$V_a$: volume of the auxiliary combustion chamber 17
$V_{a1}$: volume of the primary cavity 18
$V_c$: total combined volume of the primary cavity 18, secondary cavity 20, and main combustion chamber 13, when the piston is at top dead center experimental data has shown that:

$$V_a/V_c = 0.06 - 0.18$$

$$V_{a1}/V_a = 0.4 - 0.6$$

to produce optimum results.

When $V_a/V_c$ is made smaller, there is a decrease in the amount of HC emissions by an increase in the amount of $NO_x$ emissions. When $V_a/V_c$ is made larger, there is a decrease in the amount of $NO_x$ emissions but an increase in the amount of HC emissions, and when it is made larger there is a decrease in the amount of $NO_x$ emissions.

Figure 2:
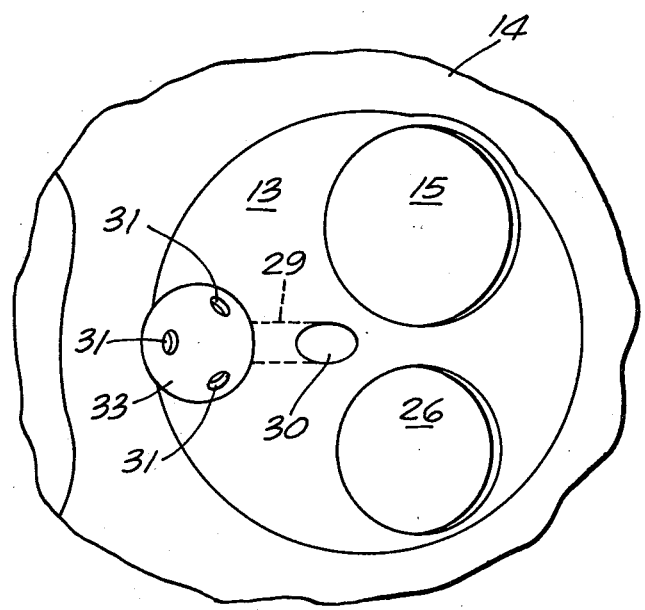
FIG. 2 is a view partly broken away looking up under the cylinder head to show the combustion chamber.
Figure 3:
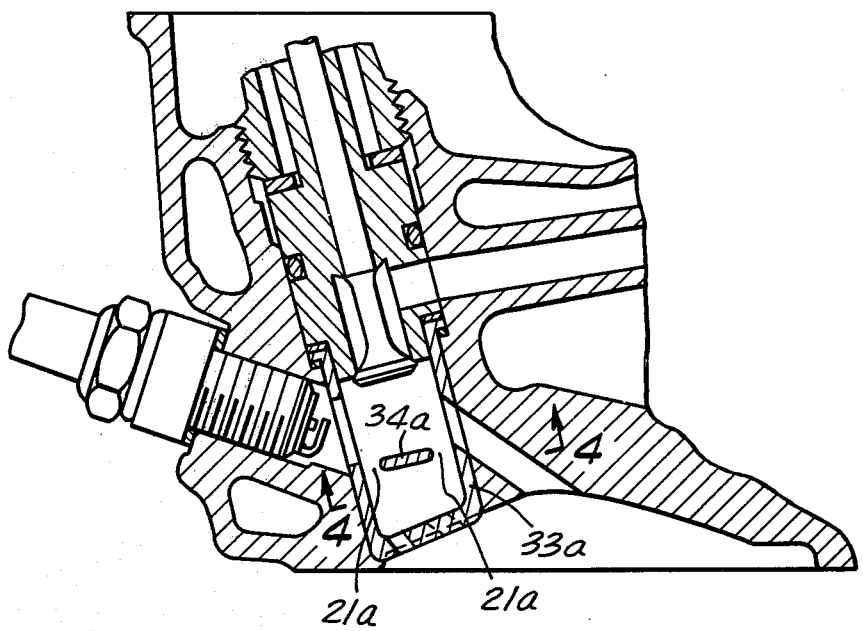
FIG. 3 is a sectional elevation similar to FIG. 1 but showing a modification.
Figure 4:
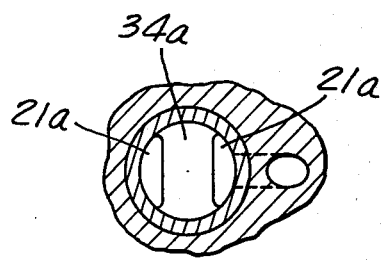
FIG. 4 is a sectional detail taken substantially on line 4—4 as shown on FIG. 3.
Figure 5:
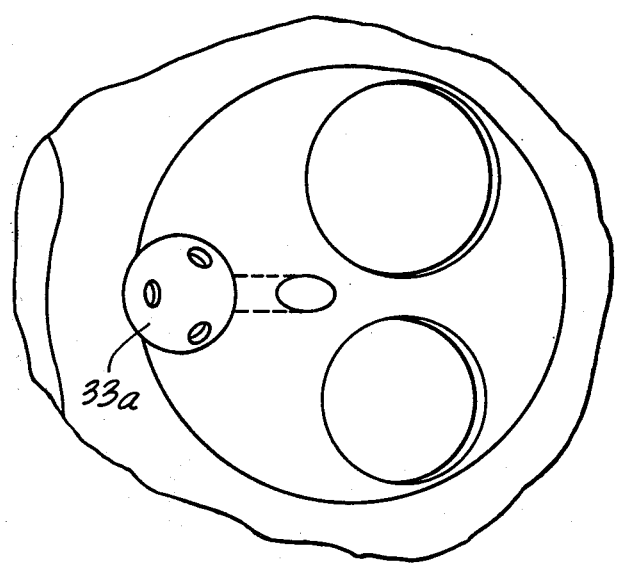
FIG. 5 is a view partly broken away looking up under the cylinder head of the device shown in FIG. 3.

In the modified form of the invention shown in FIGS. 3, 4 and 5, the integral divider wall 34a of the insert liner 33a extends across the central portion of the insert liner 33a, openings 21a being formed on each side. The insert liner 33a, like the insert liner 33, is preferably formed of heat resistant material, for example, stainless steel. In other respects, the construction, and operation of this form of the invention are the same as that previously described in connection with FIGS. 1 and 2.

In both forms of the invention each secondary torch passage is smaller in cross section area than the cross section area of each primary torch passage. This construction helps to make sure that under heavy engine loading the primary torch passage or passages are principally responsible for combustion.

Having fully described our invention, it is to be understood that we are not to be limited to the details herein set forth but that our invention is of the full scope of the appended claims.

We claim:

1. In an internal combustion piston engine, the combustion of: a cylinder head, a main combustion chamber, means forming an auxiliary combustion chamber in the cylinder head, means dividing said auxiliary combustion chamber into a primary cavity and a secondary cavity, an opening connecting said primary and secondary cavities, spark ignition means communicating with said primary cavity, both cavities being contained within an integral insert liner having an end wall exposed to the main combustion chamber, means for supplying a relatively lean air-fuel mixture to said main combustion chamber, means including an auxiliary intake valve for supplying a relatively rich air-fuel mixture to said primary cavity, a relatively long primary torch passage extending from said primary cavity to said main combustion chamber and having an outlet end positioned near the center of said main combustion chamber, and at least one relatively short secondary torch passage extending from said secondary cavity to said main combustion chamber and having an outlet end positioned adjacent a peripheral zone of said main combustion chamber.

2. In an internal combustion piston engine, the combination of: a cylinder head, a main combustion chamber, means forming an auxiliary combustion chamber in the cylinder head, means dividing said auxiliary combustion chamber into a primary cavity and a secondary cavity, an opening connecting said primary and secondary cavities, said opening being formed in an integral divider wall of the insert liner, spark ignition means communicating with said primary cavity, both cavities being contained within an integral insert liner having an end wall exposed to the main combustion chamber, means for supplying a relatively lean air-fuel mixture to said main combustion chamber, means including an auxiliary intake valve for supplying a relatively rich air-fuel mixture to said primary cavity, a relatively long primary torch passage extending from said primary cavity to said main combustion chamber and having an outlet end positioned near the center of said main combustion chamber, a plurality of relatively short secondary torch passages extending from said secondary cavity to said main combustion chamber and each having an outlet end positioned adjacent a peripheral zone of said main combustion chamber.

3. In an internal combustion piston engine, the combination of: a cylinder head, a main combustion chamber, means forming an auxiliary combustion chamber in the cylinder head, means dividing said auxiliary combustion chamber into a primary cavity and a secondary cavity, openings formed on each side of an integral divider wall extending across said insert liner, said openings connecting said primary and secondary cavities, spark ignition means communicating with said primary cavity, both cavities being contained within an integral insert liner having an end wall exposed to the main combustion chamber, means for supplying a relatively lean air-fuel mixture to said main combustion chamber, means including an auxiliary intake valve for supplying a relatively rich air-fuel mixture to said primary cavity, a relatively long primary torch passage extending from said primary cavity to said main combustion chamber and having an outlet end positioned near the center of said main combustion chamber, a plurality of relatively short secondary torch passages extending from said secondary cavity to said main combustion chamber and each having an outlet end positioned adjacent a peripheral zone of said main combustion chamber.

* * * * *